United States Patent
Urian (10) Patent No.: US 12,192,333 B2
(45) Date of Patent: Jan. 7, 2025

(54) METHOD AND DEVICE FOR CODE-BASED GENERATION OF A KEY PAIR FOR ASYMMETRIC CRYPTOGRAPHY

(71) Applicant: Infineon Technologies AG, Neubiberg (DE)

(72) Inventor: Rainer Urian, Augsburg (DE)

(73) Assignee: Infineon Technologies AG, Neubiberg (DE)

( * ) Notice: Subject to any disclaimer, the term of this patent is extended or adjusted under 35 U.S.C. 154(b) by 233 days.

(21) Appl. No.: 17/857,502

(22) Filed: Jul. 5, 2022

(65) Prior Publication Data
US 2023/0048825 A1    Feb. 16, 2023

(30) Foreign Application Priority Data

Jul. 16, 2021    (DE) .......................... 102021118435.5

(51) Int. Cl.
| | |
|---|---|
| *H04L 9/08* | (2006.01) |
| *G06F 17/16* | (2006.01) |
| *H04L 1/00* | (2006.01) |
| *H04L 9/30* | (2006.01) |

(52) U.S. Cl.
CPC ............ *H04L 9/0825* (2013.01); *G06F 17/16* (2013.01); *H04L 1/0063* (2013.01); *H04L 9/0869* (2013.01); *H04L 9/3026* (2013.01); *H04L 9/3033* (2013.01); *H04L 9/3066* (2013.01)

(58) Field of Classification Search
CPC ... H04L 9/0825; H04L 1/0063; H04L 9/0869; H04L 9/3026; H04L 9/3033; H04L 9/3066; H04L 9/304; H04L 9/0861; H04L 9/08; G06F 17/16; G06F 21/602
See application file for complete search history.

(56) References Cited

U.S. PATENT DOCUMENTS

| | | | | |
|---|---|---|---|---|
| 2014/0105403 A1* | 4/2014 | Baldi | ...................... | H04L 9/304 380/282 |
| 2014/0181171 A1* | 6/2014 | Dourbal | .................. | G06F 17/16 708/607 |
| 2018/0173589 A1* | 6/2018 | Chang | .................. | G06F 21/6218 |

(Continued)

FOREIGN PATENT DOCUMENTS

WO    2012066328 A1    5/2012

OTHER PUBLICATIONS

D. Bernstein, et al., "McBits: Fast Constant Time Code-Based Cryptography," Cryptographic Hardware and Embedded Systems—CHES, 23 pgs., Jun. 11, 2013.

(Continued)

*Primary Examiner* — Quazi Farooqui
(74) *Attorney, Agent, or Firm* — Banner & Witcoff Ltd.

(57) ABSTRACT

According to various embodiments, a method for code-based generation of a key pair for asymmetric cryptography is described including generating a private key defining a linear code, determining a parity check or generator matrix for the linear code, blinding a sub-matrix of the parity check or generator matrix, generating a blinded inverse matrix by inverting the blinded sub-matrix or by inverting a quadratic matrix contained in the blinded sub-matrix, de-blinding the blinded inverse matrix to generate an inverse matrix and generating a public key for the private key using the inverse matrix.

20 Claims, 3 Drawing Sheets

(56) References Cited

U.S. PATENT DOCUMENTS

2023/0186293 A1* 6/2023 Dolev ............... H04L 9/0869
                                                                705/75

OTHER PUBLICATIONS

R. J. McEliece, "A Public-Key Cryptosystem Based on Algebraic Coding Theory," DSN Progess Report 42-44, 3 pgs., Jan. and Feb. 1978.
P. Mohassel, "Efficient and Secure Delegation of Linear Algebra," Cryptology ePrint Archive, 33 pgs., 2011.
X. Lei, et al., "Outsourcing Large Matrix Inversion Computation To A Public Cloud," IEEE Transactions on Cloud Computing, 10 pgs., Sep. 26, 2013.
F. Strenzke, "A Smart Card Implementation of the McEliece PKC," Information Security Theory and Practices, 13 pgs., 2010.
M. R. Albrecht, et al., "Classic McEliece: Conservative Code-Based Cryptography," url: https://classic.mceliece.org/nist/mceliece-20201010.pdf, 55 pgs., Oct. 10, 2020.
Mar. 9, 2023 (DE) Office Action—App. DE 102021118435.5.

* cited by examiner

FIG 2

METHOD AND DEVICE FOR CODE-BASED GENERATION OF A KEY PAIR FOR ASYMMETRIC CRYPTOGRAPHY

TECHNICAL FIELD

The present disclosure relates to methods and devices for code-based generation of a key pair for asymmetric cryptography.

BACKGROUND

With the development of quantum computers, it is desirable to move away from classical asymmetric cryptosystems like RSA (Rivest Shamir Adleman) and ECC (Elliptic Curve Cryptography) to schemes which cannot be attacked by quantum computers. Currently, quantum computers are not available due to the technical complexity and engineering challenges but once built, they would be able to break RSA and ECC in polynomial time. As a consequence, alternative schemes are investigated. One class of such schemes are code-based encryption schemes wherein a key pair including a public key and a private key is generated on the basis of a (linear) code.

Efficient approaches for implementing such code-based generation of a key pair for asymmetric cryptography, in particular in case of usage on security chips with little memory or chips susceptible to side channel attacks, are desirable.

SUMMARY

According to various embodiments, a method for code-based generation of a key pair for asymmetric cryptography is provided including generating a private key defining a linear code, determining a parity check or generator matrix for the linear code, blinding a sub-matrix of the parity check or generator matrix, generating a blinded inverse matrix by inverting the blinded sub-matrix or by inverting a quadratic matrix contained in the blinded sub-matrix, de-blinding the blinded inverse matrix to generate an inverse matrix and generating a public key for the private key using the inverse matrix.

BRIEF DESCRIPTION OF THE DRAWINGS

In the drawings, similar reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
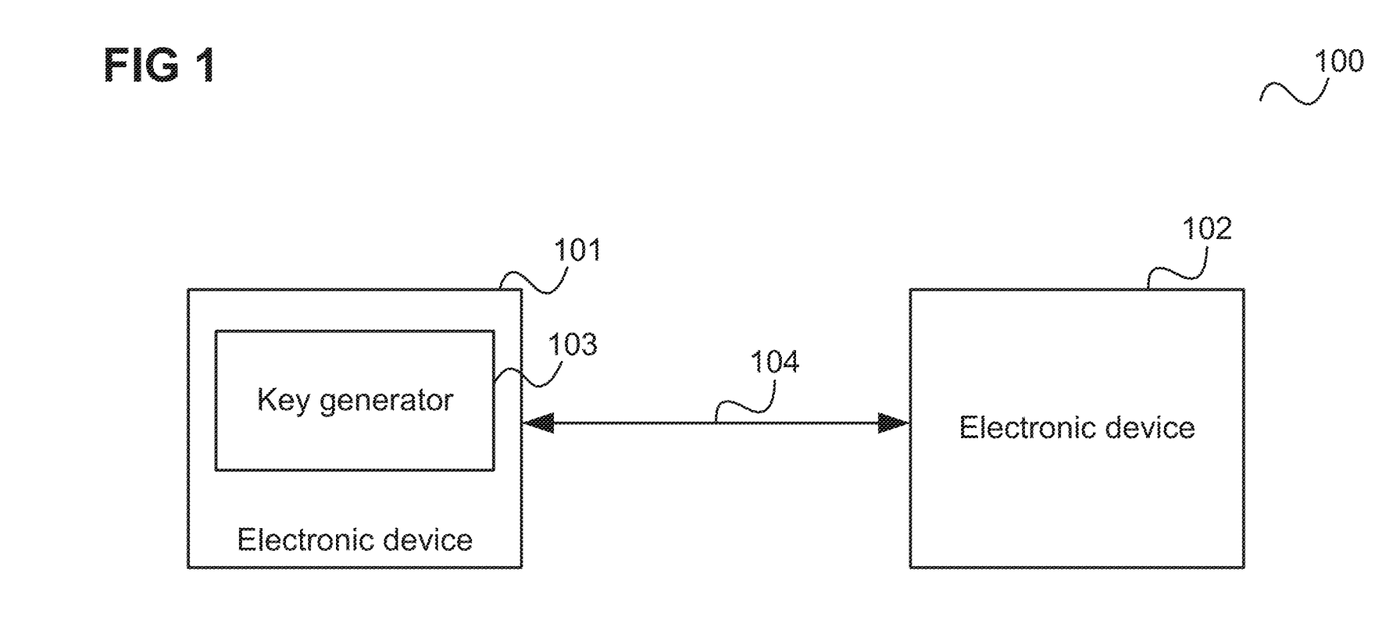
FIG. 1 shows a communication arrangement according to an embodiment.

FIG. 1 shows a communication arrangement 100 according to an embodiment.

The communication arrangement 100 includes a first electronic device 101 and a second electronic device 102. The first electronic device 101 and the second electronic device 102 communicate via a communication connection 104 which may be provided by one or more wireless or wired communication channels.

For example, the first electronic device 101 is a smartcard (of any form factor) and the second electronic device 102 is a card reader, or the first electronic device 101 is a microcontroller unit (MCU), e.g. in a vehicle, and the second electronic device 102 is another MCU or a central control device (e.g. of a vehicle).

For security of communication between the electronic devices 101, 102, the electronic devices 101, 102 use a private/public key encryption scheme. Specifically, the first electronic device 101 includes a key generator 103 (i.e. a key generation device).

The key generator 103 may be implemented by one or more data processing elements, e.g. a security chip or hardware security module (HSM), e.g. a hardware root of trust.

The key generator 103 is configured to generate a key pair including a public key and a private key for asymmetric cryptography. For example, the first electronic device 101 provides the public key to the second electronic device 102 such that the second electronic device 102 may encrypt data to be sent to the first electronic device 101 using the public key. The first electronic device 101 may decrypt the encrypted data using the private key of the key pair. The first electronic device 101 may also use the private key for signing data.

In view of the development of quantum computers, according to various embodiments, the key generator 103 generates the key pair using a code-based encryption scheme.

In the following, for an integer m, $\mathbb{F}_{2^m}$ denotes the finite (Galois) field with $2^m$ elements. As explicit arithmetic is done it is assumed that a fixed minimal polynomial f of degree m is given. An element of $\mathbb{F}_{2^m}$ is represented by a polynomial of degree less than m. By interpreting the coefficients of this polynomial as an m-dimensional vector over $\mathbb{F}_2$, an $\mathbb{F}_2$-vector space isomorphism is obtained:

$$t: \mathbb{F}_{2^m} \to \mathbb{F}_2^m \qquad (1)$$

This isomorphism can be extended to vectors or matrices over $\mathbb{F}_{2^m}$ in a natural way. If it is clear from the context, this isomorphism is in following implicitly used without mentioning t. Capital size letters are used to denote matrices over $\mathbb{F}_2$ (and over $\mathbb{F}_{2^m}$, respectively). The n×n identity matrix over $\mathbb{F}_2$ is written as $\mathbb{I}_n$. If A is a matrix, then A[i,j] denotes the element of A from row i and column j A[i,•] denotes the vector consisting of elements from row i of A A[•,j] denotes the vector consisting of elements from column j of A If a is a vector then a[i] or $a_i$ is used to denote the i'th component of a.

Index enumeration in a vector or matrix always start at 1.

The system parameters of the systematic Niederreiter cryptosystem consist of the following:
- m: degree of finite field $\mathbb{F}_{2^m}$
- t: degree of the Goppa polynomial $g \in \mathbb{F}_{2^m}[x]$
- k: codesize (or code dimension)
- n: code length; can be calculated from the previous numbers as n:=k+mt The key generation algorithm according to systematic Niederreiter cryptosystem includes the following:
1. Private key $\Gamma$
   a. Generate uniformly at random a monic irreducible polynomial $g \in \mathbb{F}_{2^m}[x]$ of degree t. This is called the Goppa polynomial.
   b. Select uniformly at random n distinct elements $(\alpha_1, \ldots, \alpha_n)$ from $\mathbb{F}_{2^m}$.
   c. The private key is then $\Gamma:=(g, (\alpha_1, \ldots, \alpha_n))$.
2. Public key T
   a. Generate a matrix $H \in \mathbb{F}_{2^m}^{(t \times n)}$ by $H[i,j]:=a_j^{i-1}/g(\alpha_j)$ for $1 \le i \le n-k$, $1 \le j \le n$, and interpret this matrix via the isomorphism from equation (1) as an element of $\mathbb{F}_2^{mt \times n}$.
   b. Write $H:=(H_0|H_1)$, where
      $H_0[\bullet,j]:=H[\bullet,j]$ with $1 \le j \le n-k$
      $H_1[\bullet,j-mt]:=H[\bullet,j]$ with $n-k+1 \le j \le n$
   c. Check if $H_0$ is regular. If this is not the case, restart the algorithm at operation 1.
   d. Compute $S:=H_0^{-}$.
   e. Calculate the public key $T:=SH_1$.

The matrix H is the parity check matrix for the code. It should be noted that here and in the following examples, the parity check matrix is written such that a parity check is done by multiplication of a received word by writing the word as a column vector and multiplying the word with the matrix from the right. However, the word can also be written as a row vector and multiplied with the transposition of the H from the left. Therefore, also $H^T$ (transposition of H) can be seen as parity check matrix. Accordingly, the cases of H being the parity check matrix and $H^T$ being the parity check matrix are distinguished herein, in particular when the numbers of rows and columns of the parity check matrix are discussed, since rows and columns are interchanged by transposition.

With the public key pair generated by the key generator 103, the second electronic device 102 (provided with the public key of the key pair by the first electronic device 101) may encrypt a plaintext message m as follows:
1. Encode the message m as a vector $e \in \mathbb{F}_2^n$ of Hamming-weight t.
2. Compute the ciphertext c=Te.

The second electronic device 102 may then send the ciphertext (i.e. the encrypted message) to the first electronic device 101 which, using the private key of the key pair, may decrypt the ciphertext $c \in \mathbb{F}_2^{mt}$ as follows:
1. Extend c to $v=(c, 0, \ldots, 0) \in \mathbb{F}_2^n$ by appending k zeros.
2. With a syndrome decoder find the unique codeword c in the Goppa code defined by $\Gamma$ that is at distance $\le t$ from v. There are various choices for syndrome decoders. An example is the Berlekamp-Massey algorithm.
3. Check that e has Hamming-weight t and decode e to the message m.

It should be noted that the cryptogram sizes are typically between 128 and 240 bytes. Encryption and decryption performance is very fast, even on small microprocessors. Private key size is between 6.5K and 14 k bytes and public key size is between 260 k and more than one megabyte. This is all well possible on current small security chips. However, the RAM consumption for the key generation is high which may limit the devices on which the above key generation may be used.

According to various embodiments, a key generation scheme—denoted as (code-based) split key generation—is provided which is an extension of the above key generation scheme in a way that allows it to be implemented using a hardware security module having low memory (e.g. on a standard smart card security controller). This is achieved by performing the matrix inversion (corresponding to 2(d) of the above algorithm) on another data processing element, e.g. an application processor, which may be less secure than the hardware security module itself (i.e. the hardware security module has, with respect to the other data processing element, additional and/or extended security mechanisms, e.g. side-channel attack countermeasures, sensors to detect light attacks, well sensors, masking, access restrictions etc.). Furthermore, the split key generation provides (additional) protection against side channel attacks, both in the case that it is implemented on a hardware security module (i.e. without outsourcing of the matrix inversion) and in the case that it is implemented on a hardware security module and an application processor (i.e. with outsourcing of the matrix inversion).

Regarding memory requirements, it can be assumed that matrix multiplication can be done efficiently with two matrices stored in a non-volatile memory (NVM) and with a negligible amount of random access memory (RAM). The same applies for matrix by vector multiplication, where for example the vector is in RAM and the matrix in NVM.

For the generation of the private key $\Gamma$, Gaussian elimination of a $(t+1) \times t$ matrix over $\mathbb{F}_{2^m}$ may be used for calculation of the Goppa polynomial in 1a. This amounts to a RAM footprint of m(t+1)t bytes. RAM can be saved by using the Berlekamp-Massey algorithm instead of Gaussian elimination to construct the irreducible polynomial. This has the additional benefit to save code size, because the Berlekamp-Massey algorithm may also be used for decryption as mentioned above.

RAM consumption for the private key generation consumes only a few kilobytes and is therefore not critical. However, RAM consumption for the public key generation is dominated by the matrix inversion operation in 2d, which needs about $(mt)_2/8+2mt$ bytes of RAM.

For example, the smallest parameter set of n=3488, m=12, t=64 needs 75264 bytes for the public key generation. For the maximum sized parameters of n=8192, m=13, t=128 a memory of 26832 bytes for the private key and 349440 bytes for the public key generation are needed.

So, RAM consumption is a real obstacle for the public key generation on a device with limited memory such as a smart card chip. A typical smart card often has less than 64 kbytes of RAM.

In view of the above, according to various embodiments, a (code-based) split key generation is provided which may be securely implemented using a more secure first data processing element (having limited memory resources) and a less secure second data processing element (with more memory resources). Even in case memory on a single (secure) data processing element is sufficient, the split key generation may be used to improve security against side-channel attacks.

In the following, embodiments are described where the split key generation is implemented on two data processing elements. However, as mentioned above, it may also be implemented on a single data processing element (e.g. a hardware security module).

Figure 2:
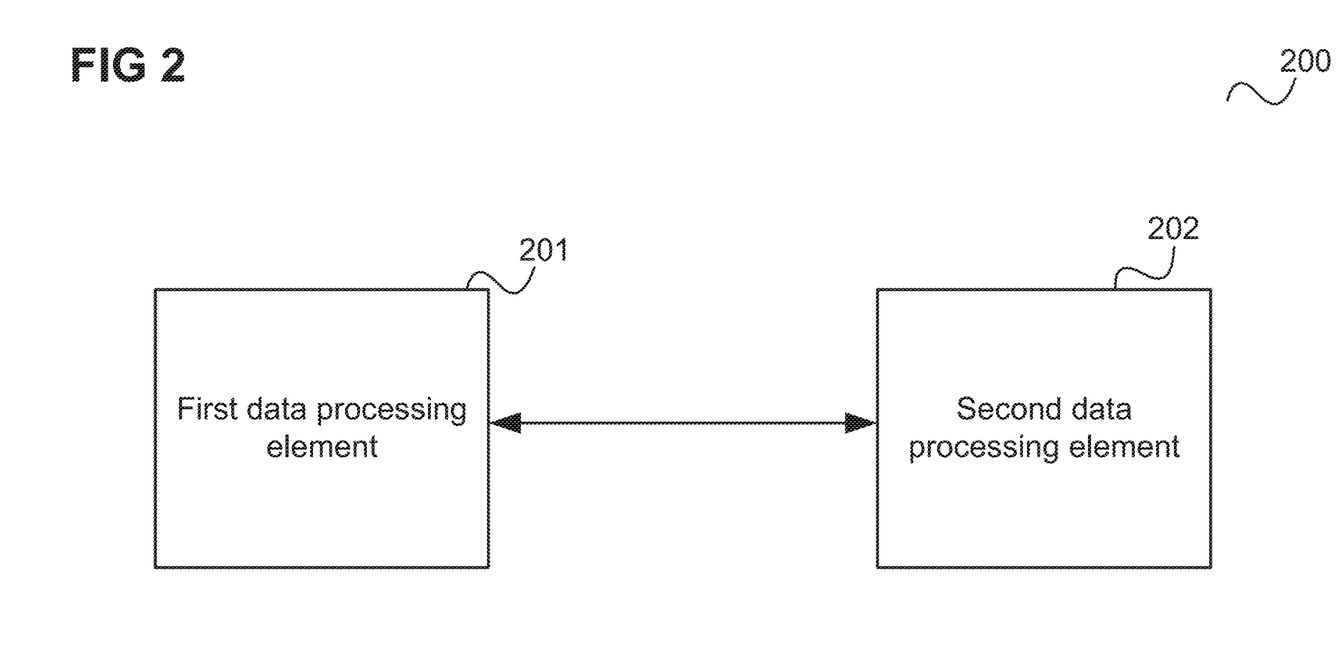
FIG. 2 shows a data processing arrangement according to an embodiment.

FIG. 2 shows a data processing arrangement 200.

The data processing arrangement 200 includes a first data processing element 201 and a second data processing element 202 connected to each other (e.g. via a bus). The first data processing element 201 is assumed to be trusted while the second data processing element 202 is assumed to be untrusted. For example, the first data processing element 201 is a hardware security module (e.g. a security chip such as a smart card controller) and the second data processing element 202 is an application processor (e.g. of a host system). The first data processing element 201 and the second data processing element 202 may or may not be implemented on a single chip (e.g. may or may not be part of the same SoC (system on chip)). The first data processing element 201 may for example be a secure processor of a control device and the second data processing element 202 may be an application processing core of the control device (e.g. of the first electronic device 101).

The data processing arrangement 200 implements a key generator 103. The key generator 103 may for example be a key generation device formed by a first data processing element 201 inserted in a host device including the second data processing element 202, e.g. by a smart card inserted in a host device (like a mobile phone having an application processor).

According to various embodiments, the first data processing element 101 has limited resources (e.g. 48 kBytes RAM, 2 Mbytes NVM) and is connected to the second data processing element 102 having more memory resources (e.g. a few megabytes of RAM). The second data processing element 102 may be untrusted.

According to various embodiments, the matrix inversion of 2d, which has high memory requirements outsourced from the first data processing element 101 to the second first data processing element 102, e.g. to a host system connected to a smart card (wherein the smart card contains the hardware security module), such that the RAM requirements for public key generation at the first data processing element 101 are reduced.

As it is assumed that the second data processing element 202 is untrusted, it is important that no information about the private key H is leaked to the second data processing element 202. This is achieved by sending only a blinded version of the matrix $H_0$ to the second data processing element 202. The second data processing element 202 then performs matrix inversion on that blinded matrix and sends the blinded inverse matrix to the first data processing element 202. By unblinding (i.e. de-blinding), the first data processing element 201 can finally reconstruct S. As the key generation is now split between the first data processing element 202 and the second data processing element 202, the key generation is denoted as split key generation.

As mentioned above, even if the inversion is not outsourced to the second data processing element 202, for example in case the first data processing element 201 has sufficient memory, side channel protection is improved because the matrix is inverted in blinded form and thus an attacker cannot gain information about the matrix by a side-channel attack the attacker performs during the inversion.

The following algorithm 1 shows split key generation according to a first embodiment. If it is implemented on a single data processing element, i.e. without outsourcing the matrix inversion, both columns are executed on the same data processing element and the transmissions between the two data processing elements (indicated by the two arrows in algorithm 1) are omitted.

| Algorithm 1: split key generation according to a first embodiment | |
|---|---|
| First data processing element | Second data processing element |
| Generate $\Gamma$ <br> $R \xleftarrow{\$} GL_{mt}(\mathbb{F}_2)$ <br> $H_0[i, j] \leftarrow$ <br> $\alpha_i^j/g(\alpha_i)\|_{j=1,\ldots,mt}^{i=1,\ldots,t}$ <br> $\tilde{H} \leftarrow RH_0$ | |
| | $\xrightarrow{\tilde{H}}$ |
| | if $\tilde{H} \notin GL_{mt}(\mathbb{F}_2)$ abort <br> $\tilde{S} \leftarrow \tilde{H}^{-1}$ |
| | $\xleftarrow{\tilde{S}}$ |
| $S \leftarrow \tilde{S}R$ <br> if $SH_0 \neq \mathbb{I}_{mt}$ abort <br> $H_1[i, j] \leftarrow$ <br> $\alpha_i^{j+mt}/g(\alpha_i)\|_{j=1,\ldots,k}^{i=1,\ldots,t}$ <br> $T \leftarrow SH_1$ | |

Algorithm 1 is described in the following in more detail.
1. The first data processing element 201
   a. generates the private key $\Gamma$ as in the systematic Niederreiter cryptosystem described above (item 1 in the above description of Niederreiter cryptosystem).
   b. chooses uniformly at random a regular matrix $R \in GL_{mt}(\mathbb{F}_2)$.
   c. calculates the matrix $H_0$ as $H_0[i,j]:=\alpha_i^j/g(\alpha_i)$ for $1 \leq i \leq t$, $1 \leq j \leq mt$ and interprets this matrix via the isomorphism t as an element of $\mathbb{F}_2^{mt \times n}$.
   d. blinds $H_0$ by multiplication with R.
   e. sends the blinded matrix $\tilde{H}:=RH_0$ to the host.
2. The second data processing element 202
   a. calculates $\tilde{S}:=\tilde{H}^{-1}$. If the inverse does not exist it aborts (and the algorithm restarts).
   b. sends $\tilde{S}$ to the first data processing element 201.
3. The first data processing element 201
   a. unblinds the matrix inverse $\tilde{S}$ by calculating $S:=\tilde{S}R$.
   b. checks that the second data processing element 201 has correctly performed the inversion by checking that $SH_0$ is the identity matrix $\mathbb{I}_{mt}$. If the verification fails, the first data processing element 201 aborts the algorithm and the key generation returns fail. Otherwise it marks the private key as valid.
   c. reconstructs the public key. It calculates $\hat{H}[i,j]:= \alpha_i^{j-mt}/g(\alpha_i)$ for $1 \leq i \leq mt$ and $mt+1 \leq i \leq n$ and then multiplies with S to get the public key $T:=SH_1$.

It should be noted that algorithm 1 produces the same result as the key generation according to Niederreiter cryptosystem described above. The following equalities show that the matrix $S:=\tilde{S}R$ produced by algorithm 1 is the same as the matrix $S:=H_0^{-1}$ produced by the key generation according to Niederreiter cryptosystem described above:

$$\tilde{S}R = \tilde{H}^{-1}R = (RH_0)^{-1}R = H_0^{-1}R^{-1}R = H_0^{-1}$$

Therefore both key generates schemes produce the same systematic form of the public key.

Regarding security, it should be noted that the blinded matrix $\tilde{H}$ does not reveal any exploitable information about the private matrix H. Further, the first data processing element 201 may detect an incorrectly calculated $\tilde{S}$. This is because the first data processing element 201 checks if S is the inverse of $\tilde{H}_0$ in 3b of algorithm 1. Either the inverse does not exist or it is unique and therefore this check is sufficient.

As mentioned, the above example is based on the Niederreiter cryptosystem. According to Niederreiter cryptosystem, column vectors are multiplied from the right to the parity check matrix.

An alternative is the McEliece method where row vectors are multiplied from the left to the code matrix.

The above approach (as well as the variants described below) may also be applied in context of the McEliece method since a systematic code matrix G may be easily calculated from the systematic parity check matrix according to $$H=(I_{n-k}|H_0) \to G=(-H_0^T|I_k)$$

Algorithm 1 requires the generation of a random invertible matrix $R \in GL_{mt}(\mathbb{F}_2)$. The simplest way to do this is to generate a uniform random matrix $R \in \mathbb{F}_2^{mt \times mt}$ and try again if R is not invertible. However a random binary matrix will be invertible (for a typical parameter set) only with a probability about 0.29.

Algorithm 1 has to restart if the matrix $\tilde{H}$ is not invertible. This happens if either R or $H_0$ is not invertible. Both events are stochastically independent and each one has for a typical parameter set a probability 0.29. Therefore the probability that $\tilde{H}$ is invertible is only $0.29^2 = 0.084$. This means, on average approximately 12 trials are necessary until a proper key is found.

Therefore, according to various embodiments, an approach is provided which allows significantly reducing the probability that the algorithm needs to be restarted. For this, a small numbers $\delta_R$ is chosen and the matrix R is enlarged to a matrix R' by appending $\delta_R$ additional random rows. Similarly, a small number $\delta_H$ is chosen and the matrix $H_0$ is enlarged to the matrix $H_0$' by appending $\delta_H$ additional columns: $\alpha_i^{j+mt}/g(\alpha_i)$, j=1, . . . , $\delta_H$. Then $\tilde{H}:=R'H_0'$ is calculated which is a matrix of dimension $(mt+\delta_R) \times (mt+\delta_H)$.

The second data processing element 202 then selects from this matrix $\tilde{H}$ an invertible quadratic matrix $\tilde{H}_0$ of dimension mt×mt (by selecting sub-rows and sub-columns of H which do not necessarily have to be contiguous)

The following algorithm 2 shows split key generation according to a second embodiment using the approach described above for reducing the probability that the algorithm needs to restart. As in the case of algorithm 1, if it is implemented on a single data processing element, i.e. without outsourcing the matrix inversion, both columns are executed on the same data processing element and the transmissions between the two data processing elements (indicated by the two arrows in algorithm 2) are omitted.

| Algorithm 2: split key generation according to a second embodiment | |
|---|---|
| First data processing element | Second data processing element |
| Generate Γ $R'[i, j] \xleftarrow{\$} \mathbb{F}_2\|_{j=1,\ldots,mt}^{i=1,\ldots,mt+\delta_H}$ $H'_0[i, j] \leftarrow$ $\alpha_i^j/g(\alpha_i)\|_{j=1,\ldots,mt+\delta_H}^{i=1,\ldots,t}$ $\tilde{H} \leftarrow R'H'_0$ | |
| $\xrightarrow{\tilde{H}}$ | |
| | if rank($\tilde{H}$) < mt then abort else calculate: |
| | π: permutation of $\{1,\ldots,mt+\delta_H\}$ σ: $\{1,\ldots,mt\} \hookrightarrow \{1,\ldots,mt+\delta_H\}$ $\tilde{H}_0[i, j] \leftarrow \tilde{H}[\sigma(i), \pi(j)]\|_{j=1,\ldots,mt}^{i=1,\ldots,mt}$ $\tilde{S} \leftarrow \tilde{H}_0^{-1}$ |
| $\xleftarrow{(\tilde{S}, \pi, \sigma)}$ | |
| $\alpha_i \leftarrow \alpha_{\pi(i)}, 1 \le i \le mt+\delta_H$ $R[i, j] \leftarrow$ $R'[\sigma(i), j]\|_{j=1,\ldots,mt}^{i=1,\ldots,mt}$ $H_0[i, j] \leftarrow \alpha_i^j/g(\alpha_i)\|_{j=1,\ldots,mt}^{i=1,\ldots,t}$ $S \leftarrow \tilde{S}R$ if $SH_0 \ne \mathbb{I}_{mt}$ then abort $H_1[i, j] \leftarrow$ $\alpha_i^{j+mt}/g(\alpha_i)\|_{j=1,\ldots,k}^{i=1,\ldots,t}$ $T \leftarrow SH_1$ | |

Algorithm 2 is described in the following in more detail.
1. The first data processing element 201
   a. generates the private key Γ as in the systematic Niederreiter cryptosystem described above (item 1 in the above description of Niederreiter cryptosystem).
   b. calculates a random matrix $R' \in_R \mathbb{F}_2^{(mt+\delta_R) \times mt}$.
   c. calculates the matrix $H_0' \in \mathbb{F}_2^{mt \times ((mt+\delta_H))}$ as $H_0'[i,j]:=a_i^j/g(\alpha_i)$ for $1 \le i \le mt$ and $1 \le j \le mt+\delta_H$.
   d. blinds $H_0'$ by multiplication with R', i.e. calculates $\tilde{H}:=R'H_0'$.
   e. sends the matrix $\tilde{H}$ to the second data processing element 202.
2. The second data processing element 202
   a. chooses a permutation π of the set $\{1, \ldots, mt+\delta_H\}$ and an injective function σ: $\{1, \ldots, mt\} \hookrightarrow \{1, \ldots, mt+\delta_R\}$ such that the submatrix $\tilde{H}_0[i,j]:=\tilde{H}[\sigma(i),\pi(j)]$ $1 \le i,j \le mt$ is invertible. If the inverse does not exist it aborts (and the algorithm restarts).
   b. calculates $\tilde{S}:=\tilde{H}_0^{-1}$.
   c. sends $\tilde{S}$, α, π to the first data processing element 201.
3. The first data processing element 201
   a. checks if π is a permutation of $\{1, \ldots, mt+\delta_H\}$. If this is not the case, it aborts the algorithm. Otherwise, it updates the permutation $\alpha_i$ of its private key by calculating $\alpha_i \leftarrow \alpha_{\pi(i)}$, for $1 \le i \le mt+\delta_H$.
   b. checks if σ is an injective function $\{1, \ldots, mt\} \hookrightarrow \{1, \ldots, mt+\delta_R\}$. If this is not the case, it aborts the algorithm. Otherwise it calculates the random matrix $R[i,j]:=R'[\sigma(i),j]$, with $1 \le i,j \le mt$.
   c. unblinds the matrix $\tilde{S}$ by calculating $S:=\tilde{S}R$.
   d. calculates $H_0[i,j]:=\alpha_i^j/g(\alpha_i)$ for $1 \le i,j \le mt$.
   e. checks if the Host has correctly performed the inversion by checking that $SH_0$ is the identity matrix $\mathbb{I}_{mt}$. If the verification fails, the first data processing element 201 aborts the algorithm. Otherwise it marks the private key as valid.
   f. can now reconstruct the public key. It calculates $H_1[i,j]:=\alpha_i^{j-mt}/g(\alpha_i)$ for $1 \le i \le mt$ and $mt+1 \le i \le n$ and then calculates the public key as $T:=SH_1$.

In 2, alternatively, the the second data processing element 202 chooses an injective function ρ and sends it to the first processing element 2. The first processing element 201, then, in 3, checks whether p is an injective function $\{1, \ldots, mt\} \mapsto \{1, \ldots, mt+\delta_H\}$. If this is not the case, it aborts the algorithm. Otherwise, it calculates an arbitrary permutation n of $\{1, \ldots, mt+\delta_H\}$ from ρ and updates the permutation $\alpha_i$ of its private key by calculating $\alpha_i \leftarrow \alpha_{\pi(i)}$, for $1 \leq i \leq mt+\delta_H$.

It should be noted that in algorithm 1, the sub-matrix of the parity check or generator matrix that is blinded is quadratic, while in algorithm 2, the sub-matrix of the parity check or generator matrix that is blinded is rectangular (has more columns than the parity check or generator matrix has rows), i.e. is bigger than the matrix that is inverted. Moreover, in algorithm 2, the blinding matrix has more rows than the parity check or generator matrix has rows, resulting in a blinded sub-matrix that is even bigger than the sub-matrix of the parity check or generator matrix. It should be noted that it is also possible that only one of these measures is taken, i.e. only one of the sub-matrix of the parity check or generator matrix is bigger than the matrix that is inverted or
the blinding matrix has more rows than the parity check or generator matrix has rows.

In Algorithm 2, both of these measures are taken.

As further variant, it is for example possible that instead of using all $mt+\delta_H$ columns of $H_0'$ as pivoting columns, two numbers μ, ν with $\nu-\mu=\delta_H$ may be chosen and only the columns $mt-\mu, \ldots, mt+\delta_H$ are used for pivoting. This optimization can also be applied for the rows and $\delta_R$.

A pseudo random number generator can be used to generate R and R'. This avoids storing the whole matrix R' in NVM. Only a short seed value has to be stored from which R and R' can be generated on-the-fly.

Figure 3:
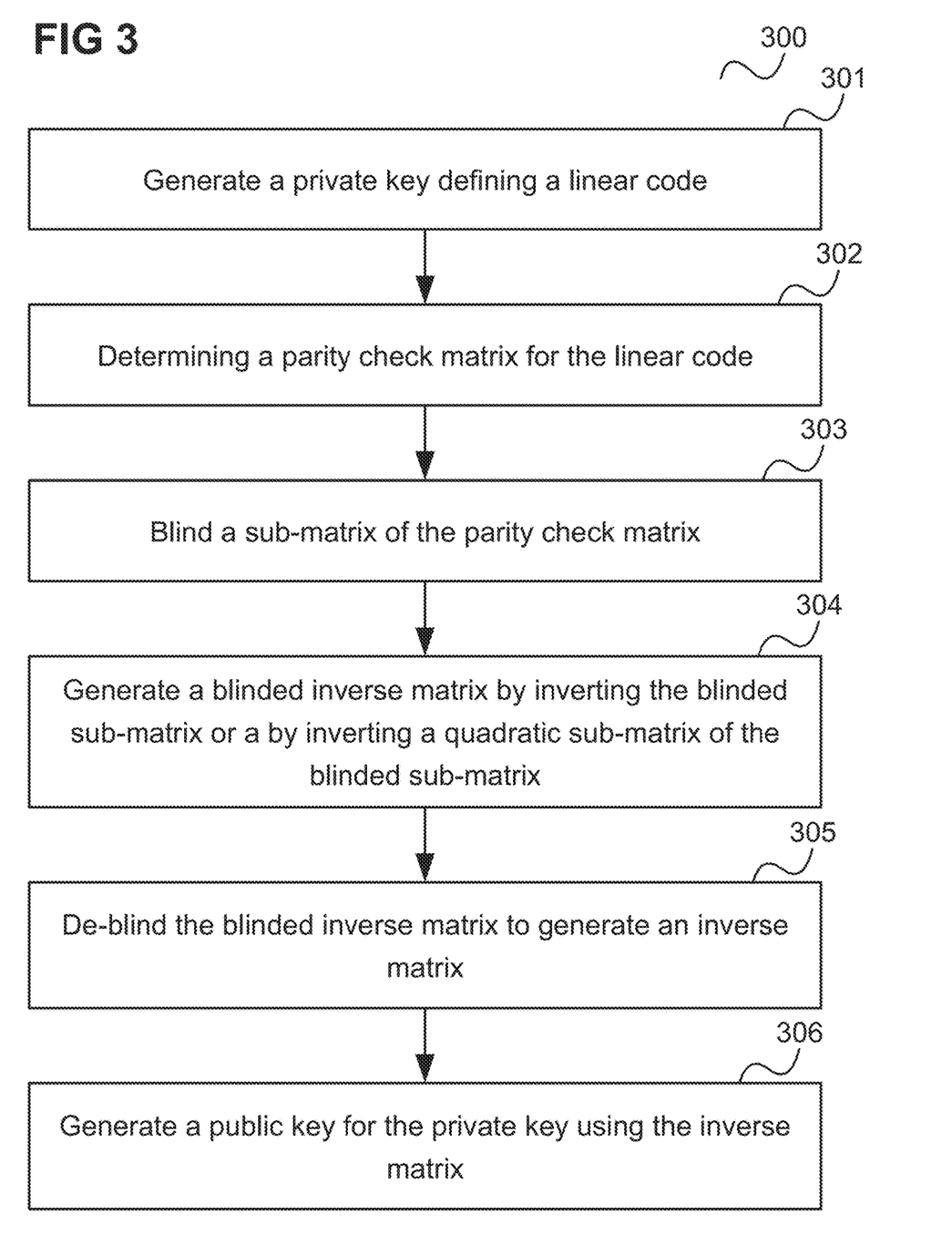
FIG. 3 shows a flow diagram illustrating a method for code-based generation of a key pair for asymmetric cryptography according to an embodiment.

In summary, according to various embodiments, a method is provided as illustrated in FIG. 3.

FIG. 3 shows a flow diagram 300 illustrating a method for code-based generation of a key pair for asymmetric cryptography according to an embodiment.

In 301, a private key defining a linear code is generated.

In 302, a parity check or generator matrix for the linear code is determined.

In 303, a sub-matrix of the parity check or generator matrix is blinded.

In 304, a blinded inverse matrix is generated by inverting the blinded sub-matrix or by inverting a quadratic matrix contained in the blinded sub-matrix. The quadratic matrix being contained in the blinded sub-matrix may be understood as that the quadratic matrix can be formed by deleting certain rows and columns of the blinded sub-matrix.

In 305, the blinded inverse matrix is de-blinded to generate an inverse matrix.

In 306, a public key for the private key is generated using the inverse matrix.

According to various embodiments, in other words, a part of a parity matrix which needs to be inverted for public key generation is blinded (in other words, masked) before it is inverted. This allows outsourcing the inversion and provides protection against side-channel attacks which occur during the inversion.

The method may for example be carried out by a key generation device (e.g. corresponding to key generation device 103) including one or more data processing elements (e.g. as in the data processing arrangement of FIG. 2.)

A data processing element may be implemented by one or more circuits. A "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Various Examples are described in the following:

Example 1 is a method for code-based generation of a key pair for asymmetric cryptography as illustrated in FIG. 3.

Example 2 is the method of Example 1, wherein generating the private key includes selecting random elements of a finite field and an irreducible polynomial with coefficients in the finite field.

Example 3 is the method of Example 2, wherein the irreducible polynomial is the Goppa polynomial of the code.

Example 4 is the method of any one of Examples 1 to 3, wherein the public key is generated by multiplying the inverse matrix with the part of the parity check or generator matrix which remains when removing the part to which the inverse matrix is the inverse.

Example 5 is the method of any one of Examples 1 to 4, wherein the parity check or generator matrix is a binary matrix and wherein the sub-matrix of the parity check or generator matrix has the same number of rows as the parity check or generator matrix and at least as many columns as rows in case the parity check matrix has more columns than rows and wherein the sub-matrix of the parity check or generator matrix has the same number of columns as the parity check or generator matrix and at least as many rows as columns in case the parity check matrix has more rows than columns.

Example 6 is the method of any one of Examples 1 to 5, wherein blinding the sub-matrix includes multiplying the sub-matrix with a blinding matrix.

Example 7 is the method of Example 6, wherein the blinding matrix is random or pseudo-random.

Example 8 is the method of Example 6 or 7, wherein the blinding matrix is invertible.

Example 9 is the method of any one of Examples 6 to 8, wherein the multiplication is a multiplication of the blinding matrix from the left and the blinding matrix has as many columns as the parity check or generator matrix has rows and as at least as many rows as the parity check or generator matrix has rows or wherein the multiplication is a multiplication of the blinding matrix from the right and the blinding matrix has as many rows as the parity check or generator matrix has columns and as at least as many columns as the parity check or generator matrix has columns.

Example 10 is the method of any one of Examples 1 to 9, including blinding the sub-matrix of the parity check or generator matrix such that the blinded sub-matrix of the parity check or generator matrix is quadratic, wherein the blinded inverse matrix is generated by inverting the sub-matrix of the parity check or generator matrix and the inverse matrix is the inverse of the sub-matrix.

Example 11 is the method of any one of Examples 1 to 10, wherein blinding the sub-matrix includes multiplying the sub-matrix with a blinding matrix and wherein the blinding matrix has as many columns as the parity check or generator matrix has rows and as many rows as the parity check or generator matrix has rows.

Example 12 is the method of any one of Examples 1 to 9, wherein the blinded inverse matrix is generated by determining an invertible quadratic matrix contained in the blinded sub-matrix of the parity check or generator matrix and inverting the invertible quadratic matrix and wherein the inverse matrix is the inverse of the de-blinded invertible quadratic matrix.

Example 13 is the method of Example 12, including blinding the sub-matrix of the parity check or generator matrix such that the blinded sub-matrix of the parity check or generator matrix has more columns, more rows or more columns and more rows than the difference between code length and code dimension.

Example 14 is the method of any Example 12 or 13, wherein blinding the sub-matrix includes multiplying the sub-matrix with a blinding matrix from the left and wherein the blinding matrix has as many columns as the parity check or generator matrix has rows and has more rows than the parity check or generator matrix has rows or wherein blinding the sub-matrix includes multiplying the sub-matrix with a blinding matrix from the right and wherein the blinding matrix has as many rows as the parity check or generator matrix has columns and has more columns than the parity check or generator matrix has columns.

Example 15 is the method of any one of Examples 12 to 14, wherein blinding the sub-matrix includes multiplying the sub-matrix with a blinding matrix from the left and the invertible quadratic matrix has as many rows and columns as the parity check or generator matrix has rows or wherein blinding the sub-matrix includes multiplying the sub-matrix with a blinding matrix from the right and the invertible quadratic matrix has as many rows and columns as the parity check or generator matrix has columns.

Example 16 is the method of any one of Examples 12 to 14, wherein the parity check or generator matrix is a binary matrix and wherein the sub-matrix of the parity check or generator matrix has more columns as rows or has more rows as columns.

Example 17 is the method of any one of Examples 1 to 16, including generating the private key, the parity check or generator matrix and the public key according to systematic Niederreiter or McEliece cryptosystem.

Example 18 is the method of any one of Examples 1 to 17, including generating the private key by a first data processing element, blinding the sub-matrix of the parity check or generator matrix by the first data processing element, transmitting the blinded sub-matrix of the parity check or generator matrix from the first data processing element to a second data processing element, receiving the blinded inverse matrix from the second data processing element at the first data processing element; and generating the public key by the first data processing element.

Example 19 is the method of Example 18, including generating the blinded inverse matrix by the second data processing element.

Example 20 is the method of Example 18 or 19, wherein the first data processing element includes extended security mechanisms in comparison to the second data processing element.

Example 21 is the method of any one of Examples 18 to 20, wherein the first data processing element is a hardware security module and the second processor is an application processor.

Example 22 is the method of any one of Examples 18 to 20, wherein the first data processing element and the second processing element are different trust zones of a processor.

Example 23 is the method of any one of Examples 18 to 22, wherein the second data processing element generates the blinded inverse matrix by inverting a quadratic matrix contained in the blinded sub-matrix of the parity check or generator matrix and the inverse matrix is the inverse of the de-blinded quadratic matrix and the method includes receiving, at the first data processing element from the second data processing element, information specifying the part of the blinded sub-matrix of the parity check or generator matrix to which the quadratic matrix corresponds.

Example 24 is a key generation device for code-based generation of a key pair for asymmetric cryptography including one or more data processing elements, wherein the one or more data processing elements are configured to generate a private key defining a linear code, determine a parity check or generator matrix for the linear code, blind a sub-matrix of the parity check or generator matrix, generate a blinded inverse matrix by inverting the blinded sub-matrix or by inverting a quadratic contained in the blinded sub-matrix, de-blind the blinded inverse matrix to generate an inverse matrix and generate a public key for the private key using the inverse matrix.

Example 25 is the method of Example 24, wherein generating the private key includes selecting random elements of a finite field and an irreducible polynomial with coefficients in the finite field.

Example 26 is the method of Example 25, wherein the irreducible polynomial is the Goppa polynomial of the code.

Example 27 is the method of any one of Examples 24 to 26, wherein the one or more data processing elements are configured to generate the public key by multiplying the inverse matrix with the part of the parity check or generator matrix which remains when removing the part to which the inverse matrix is the inverse.

Example 28 is the method of any one of Examples 24 to 27, wherein the parity check or generator matrix is a binary matrix and wherein the sub-matrix of the parity check or generator matrix has the same number of rows as the parity check or generator matrix and at least as many columns as rows in case the parity check matrix has more columns than rows and wherein the sub-matrix of the parity check or generator matrix has the same number of columns as the parity check or generator matrix and at least as many rows as columns in case the parity check matrix has more rows than columns.

Example 29 is the method of any one of Examples 24 to 28, wherein blinding the sub-matrix includes multiplying the sub-matrix with a blinding matrix.

Example 30 is the method of Example 29, wherein the blinding matrix is random or pseudo-random.

Example 31 is the method of Example 29 or 30, wherein the blinding matrix is invertible.

Example 32 is the method of any one of Examples 29 to 31, wherein the multiplication is a multiplication of the blinding matrix from the left and the blinding matrix has as many columns as the parity check or generator matrix has rows and as at least as many rows as the parity check or generator matrix has rows or wherein the multiplication is a multiplication of the blinding matrix from the right and the blinding matrix has as many rows as the parity check or generator matrix has columns and as at least as many columns as the parity check or generator matrix has columns.

Example 33 is the method of any one of Examples 24 to 32, including blinding the sub-matrix of the parity check or generator matrix such that the blinded sub-matrix of the parity check or generator matrix is quadratic, wherein the blinded inverse matrix is generated by inverting the sub-matrix of the parity check or generator matrix and the inverse matrix is the inverse of the sub-matrix.

Example 34 is the method of any one of Examples 24 to 33, wherein blinding the sub-matrix includes multiplying the sub-matrix with a blinding matrix and wherein the blinding matrix has as many columns as the parity check or generator matrix has rows and as many rows as the parity check or generator matrix has rows.

Example 35 is the method of any one of Examples 24 to 32, wherein the blinded inverse matrix is generated by determining an invertible quadratic matrix contained in the blinded sub-matrix of the parity check or generator matrix and inverting the invertible quadratic matrix and wherein the inverse matrix is the inverse of the de-blinded invertible quadratic matrix.

Example 36 is the method of Example 35, including blinding the sub-matrix of the parity check or generator matrix such that the blinded sub-matrix of the parity check or generator matrix has more columns, more rows or more columns and more rows than the difference between code length and code dimension.

Example 37 is the method of any Example 35 or 36, wherein blinding the sub-matrix includes multiplying the sub-matrix with a blinding matrix from the left and wherein the blinding matrix has as many columns as the parity check or generator matrix has rows and has more rows than the parity check or generator matrix has rows or wherein blinding the sub-matrix includes multiplying the sub-matrix with a blinding matrix from the right and wherein the blinding matrix has as many rows as the parity check or generator matrix has columns and has more columns than the parity check or generator matrix has columns.

Example 38 is the method of any one of Examples 35 to 37, wherein blinding the sub-matrix includes multiplying the sub-matrix with a blinding matrix from the left and the invertible quadratic matrix has as many rows and columns as the parity check or generator matrix has rows or wherein blinding the sub-matrix includes multiplying the sub-matrix with a blinding matrix from the right and the invertible quadratic matrix has as many rows and columns as the parity check or generator matrix has columns.

Example 39 is the method of any one of Examples 35 to 37, wherein the parity check or generator matrix is a binary matrix and wherein the sub-matrix of the parity check or generator matrix has more columns as rows or has more rows as columns.

Example 40 is the method of any one of Examples 24 to 39, wherein the one or more data processing elements are configured to generate the private key, the parity check or generator matrix and the public key according to systematic Niederreiter or McEliece cryptosystem.

Example 41 is the method of any one of Examples 24 to 40, wherein the one or more data processing elements includes a first data processing element and a second data processing element, wherein the first data processing element is configured to generate the private key, blind the sub-matrix of the parity check or generator matrix, transmit the blinded sub-matrix of the parity check or generator matrix to the second data processing element, receive the blinded inverse matrix from the second data processing element and generate the public key.

Example 42 is the method of Example 41, wherein the second data processing element is configured to generate the blinded inverse matrix.

Example 43 is the method of Example 41 or 42, wherein the first data processing element includes extended security mechanisms in comparison to the second data processing element.

Example 44 is the method of any one of Examples 41 to 43, wherein the first data processing element is a hardware security module and the second processor is an application processor.

Example 45 is the method of any one of Examples 41 to 43, wherein the first data processing element and the second processing element are different trust zones of a processor.

Example 46 is the method of any one of Examples 41 to 45, wherein the second data processing element is configured to generate the blinded inverse matrix by inverting a quadratic matrix contained in the blinded sub-matrix of the parity check or generator matrix and the inverse matrix is the inverse of the de-blinded quadratic matrix and to transmit information specifying the part of the blinded sub-matrix of the parity check or generator matrix to which the quadratic matrix corresponds to the first data processing element.

According to a further embodiment a key generation device for code-based generation of a key pair for asymmetric cryptography including one or more data processing elements is provided including
  first generating means for generating a private key defining a linear code; determining means for determining a parity check or generator matrix for the linear code,
  blinding means for blinding a sub-matrix of the parity check or generator matrix;
  second generating means for generating a blinded inverse matrix by inverting the blinded sub-matrix or by inverting a quadratic sub-matrix contained in the blinded sub-matrix;
  de-blinding means for de-blinding the blinded inverse matrix to generate an inverse matrix; and
  third generating means for generating a public key for the private key using the inverse matrix.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

REFERENCE SIGNS

100 Communication arrangement
101, 102 Electronic devices
103 Key generator
104 Communication connection
200 Data processing arrangement
201, 202 Data processing elements
300 Flow diagram
301-306 Processing

What is claimed is:

1. A method for code-based generation of a key pair for asymmetric cryptography comprising:
  generating a private key defining a linear code;
  determining a parity check or generator matrix for the linear code;
  blinding a sub-matrix of the parity check or generator matrix;

generating a blinded inverse matrix by inverting the blinded sub-matrix or by inverting a quadratic matrix contained in the blinded sub-matrix;

de-blinding the blinded inverse matrix to generate an inverse matrix; and generating a public key for the private key using the inverse matrix, wherein the blinded inverse matrix is generated by determining an invertible quadratic matrix contained in the blinded sub-matrix of the parity check or generator matrix and inverting the invertible quadratic matrix, and wherein the inverse matrix is the inverse of the de-blinded invertible quadratic matrix.

2. The method of claim 1, wherein generating the private key comprises selecting random elements of a finite field and an irreducible polynomial with coefficients in the finite field.

3. The method of claim 2, wherein the irreducible polynomial is the Goppa polynomial of the linear code.

4. The method of claim 1, wherein the public key is generated by multiplying the inverse matrix with a part of the parity check or generator matrix which remains when removing a part to which the inverse matrix is the inverse.

5. The method of claim 1, wherein the parity check or generator matrix is a binary matrix, and wherein the sub-matrix of the parity check or generator matrix has a same number of rows as the parity check or generator matrix and at least as many columns as rows in case the parity check matrix has more columns than rows, and wherein the sub-matrix of the parity check or generator matrix has a same number of columns as the parity check or generator matrix and at least as many rows as columns in case the parity check matrix has more rows than columns.

6. The method of claim 1, wherein blinding the sub-matrix comprises multiplying the sub-matrix with a blinding matrix.

7. The method of claim 6, wherein the blinding matrix is random or pseudo-random.

8. The method of claim 6, wherein the blinding matrix is invertible.

9. The method of claim 6,
wherein the multiplication is a multiplication of the blinding matrix from the left and the blinding matrix has as many columns as the parity check or generator matrix has rows and as at least as many rows as the parity check or generator matrix has rows, or
wherein the multiplication is a multiplication of the blinding matrix from the right and the blinding matrix has as many rows as the parity check or generator matrix has columns and as at least as many columns as the parity check or generator matrix has columns.

10. The method of claim 1, comprising blinding the sub-matrix of the parity check or generator matrix such that the blinded sub-matrix of the parity check or generator matrix is quadratic, wherein the blinded inverse matrix is generated by inverting the sub-matrix of the parity check or generator matrix and the inverse matrix is the inverse of the sub-matrix.

11. The method of claim 1, wherein blinding the sub-matrix comprises multiplying the sub-matrix with a blinding matrix, and wherein the blinding matrix has as many columns as the parity check or generator matrix has rows and as many rows as the parity check or generator matrix has rows.

12. The method of claim 1, comprising blinding the sub-matrix of the parity check or generator matrix such that the blinded sub-matrix of the parity check or generator matrix has more columns, more rows or more columns and more rows than a difference between code length and code dimension.

13. The method of claim 1,
wherein blinding the sub-matrix comprises multiplying the sub-matrix with a blinding matrix from the left, and the blinding matrix has as many columns as the parity check or generator matrix has rows and has more rows than the parity check or generator matrix has rows, or
wherein blinding the sub-matrix comprises multiplying the sub-matrix with a blinding matrix from the right, and the blinding matrix has as many rows as the parity check or generator matrix has columns and has more columns than the parity check or generator matrix has columns.

14. The method of claim 1, wherein blinding the sub-matrix comprises multiplying the sub-matrix with a blinding matrix from the left and the invertible quadratic matrix has as many rows and columns as the parity check or generator matrix has rows or wherein blinding the sub-matrix comprises multiplying the sub-matrix with a blinding matrix from the right and the invertible quadratic matrix has as many rows and columns as the parity check or generator matrix has columns.

15. The method of claim 1, wherein the parity check or generator matrix is a binary matrix, and wherein the sub-matrix of the parity check or generator matrix has more columns as rows or has more rows as columns.

16. The method of claim 1, comprising generating the private key, the parity check or generator matrix and the public key according to systematic Niederreiter or McEliece cryptosystem.

17. The method of claim 1, comprising:
generating the private key by a first data processing element;
blinding the sub-matrix of the parity check or generator matrix by the first data processing element;
transmitting the blinded sub-matrix of the parity check or generator matrix from the first data processing element to a second data processing element;
receiving the blinded inverse matrix from the second data processing element at the first data processing element; and
generating the public key by the first data processing element.

18. The method of claim 17, comprising generating the blinded inverse matrix by the second data processing element.

19. A key generation device for code-based generation of a key pair for asymmetric cryptography comprising one or more hardware processors, wherein the one or more hardware processors are configured to:
generate a private key defining a linear code;
determine a parity check or generator matrix for the linear code;
blind a sub-matrix of the parity check or generator matrix;
generate a blinded inverse matrix by inverting the blinded sub-matrix or by inverting a quadratic contained in the blinded sub-matrix;
de-blind the blinded inverse matrix to generate an inverse matrix; and
generate a public key for the private key using the inverse matrix,
wherein the blinded inverse matrix is generated by determining an invertible quadratic matrix contained in the blinded sub-matrix of the parity check or generator matrix and inverting the invertible quadratic matrix, and wherein the inverse matrix is the inverse of the de-blinded invertible quadratic matrix.

20. A method for code-based generation of a key pair for asymmetric cryptography performed by a key generation device having a hardware security module and a hardware processor, the method comprising:
- generating a private key defining a linear code through the hardware security module;
- determining a parity check or generator matrix for the linear code by the hardware security module;
- blinding a sub-matrix of the parity check or generator matrix by the hardware security module;
- generating a blinded inverse matrix by inverting the blinded sub-matrix or by inverting a quadratic matrix contained in the blinded sub-matrix by the hardware processor;
- de-blinding the blinded inverse matrix to generate an inverse matrix by the hardware security module; and
- generating a public key for the private key using the inverse matrix by the hardware security module,
- wherein the blinded inverse matrix is generated by determining an invertible quadratic matrix contained in the blinded sub-matrix of the parity check or generator matrix and inverting the invertible quadratic matrix, and wherein the inverse matrix is the inverse of the de-blinded invertible quadratic matrix.

* * * * *